US012585486B2

(12) United States Patent
Kumar et al.

(10) Patent No.: US 12,585,486 B2
(45) Date of Patent: Mar. 24, 2026

(54) SYSTEMS AND METHODS FOR DEPLOYING A CONTAINERIZED NETWORK FUNCTION (CNF) BASED ON INFORMATION REGARDING THE CNF

(71) Applicant: Verizon Patent and Licensing Inc., Basking Ridge, NJ (US)

(72) Inventors: Abhishek Kumar, Irving, TX (US); Hans Raj Nahata, New Providence, NJ (US); Neeraj Bhatt, Vienna, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 620 days.

(21) Appl. No.: 18/067,300

(22) Filed: Dec. 16, 2022

(65) Prior Publication Data

US 2024/0202017 A1     Jun. 20, 2024

(51) Int. Cl.
*G06F 9/455* (2018.01)
*G06F 9/48* (2006.01)

(52) U.S. Cl.
CPC ........ *G06F 9/45558* (2013.01); *G06F 9/4881* (2013.01); *G06F 2009/4557* (2013.01); *G06F 2009/45595* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | | |
|---|---|---|---|---|
| 11,677,814 | B1 * | 6/2023 | Kumar | H04L 67/10 |
| | | | | 709/223 |
| 11,800,404 | B1 * | 10/2023 | Yang | G06F 9/547 |
| 11,843,545 | B1 * | 12/2023 | Vasamsetti | H04L 47/765 |
| 2018/0018244 | A1 * | 1/2018 | Yoshimura | G06F 9/5077 |
| 2018/0227182 | A1 * | 8/2018 | Patton | H04L 41/0806 |
| 2020/0228402 | A1 * | 7/2020 | Parker | G06F 9/54 |
| 2021/0117241 | A1 * | 4/2021 | Xia | G06F 9/45558 |
| 2021/0250299 | A1 * | 8/2021 | Liu | H04L 47/125 |

(Continued)

OTHER PUBLICATIONS

Co-pending U.S. Appl. No. 17/457,781, entitled "Systems and Methods for Cloud Topology Management During Deployment of Virtual Applications," by Kumar et al., filed Dec. 6, 2021, 38 Pages.

*Primary Examiner* — Mehran Kamran

(57) ABSTRACT

In some implementations, an orchestration system may receive information regarding a containerized network function (CNF) to be deployed. The orchestration system may obtain deployment information regarding requirements for deploying the CNF, wherein the requirements include one or more of a computing requirement, a memory requirement, or a network connectivity requirement. The orchestration system may provide a request to obtain one or more recommendations regarding one or more schedulers configured to deploy CNFs associated with the requirements. The orchestration system may obtain the one or more recommendations regarding the one or more schedulers based on providing the request. The orchestration system may provide scheduler information regarding the one or more schedulers to a container management system, wherein the scheduler information is provided to cause the container management system to use the one or more schedulers to deploy the CNF on one or more computing nodes that comply with the requirements.

20 Claims, 8 Drawing Sheets

(56)  References Cited

U.S. PATENT DOCUMENTS

2021/0314171 A1* 10/2021 Choyi .................... H04L 9/3247
2021/0320844 A1* 10/2021 Kumar ................ H04L 41/0894
2022/0035650 A1* 2/2022 Banerjee ............. H04L 12/4641
2022/0053375 A1* 2/2022 Asawa ................ H04L 41/0806
2022/0075666 A1* 3/2022 Xia ........................ G06F 9/5077
2022/0182923 A1* 6/2022 Yao ........................ H04W 24/10
2022/0224759 A1* 7/2022 Khosrowpour ......... H04L 67/51
2022/0283792 A1* 9/2022 Kumar ................ H04L 41/0895
2023/0100276 A1* 3/2023 Basur Shankarappa .....................
                                                 H04L 41/0895
                                                 718/1
2023/0198907 A1* 6/2023 Raghavan ............. H04L 41/046
                                                 370/235
2023/0214274 A1* 7/2023 Draznin ................ G06F 9/5077
                                                 718/1
2023/0336420 A1* 10/2023 Trujillo ................ H04L 41/046
2023/0342183 A1* 10/2023 Xia ..................... H04L 41/0895
2024/0031444 A1* 1/2024 Simon ................ G06F 9/45558
2024/0187304 A1* 6/2024 Deshmukh .......... H04L 43/0882
2024/0195695 A1* 6/2024 Pandey ................. H04L 41/40
2024/0202017 A1* 6/2024 Kumar ................ G06F 9/45558
2024/0244104 A1* 7/2024 Venkataraghavan ..... G06F 8/60
2024/0259463 A1* 8/2024 Nakazato ................. G06F 8/60
2024/0311175 A1* 9/2024 Xie ..................... G06F 9/45558
2024/0314042 A1* 9/2024 Ju .......................... H04L 41/34
2025/0227030 A1* 7/2025 Svensson ........... H04L 41/5054

* cited by examiner

100

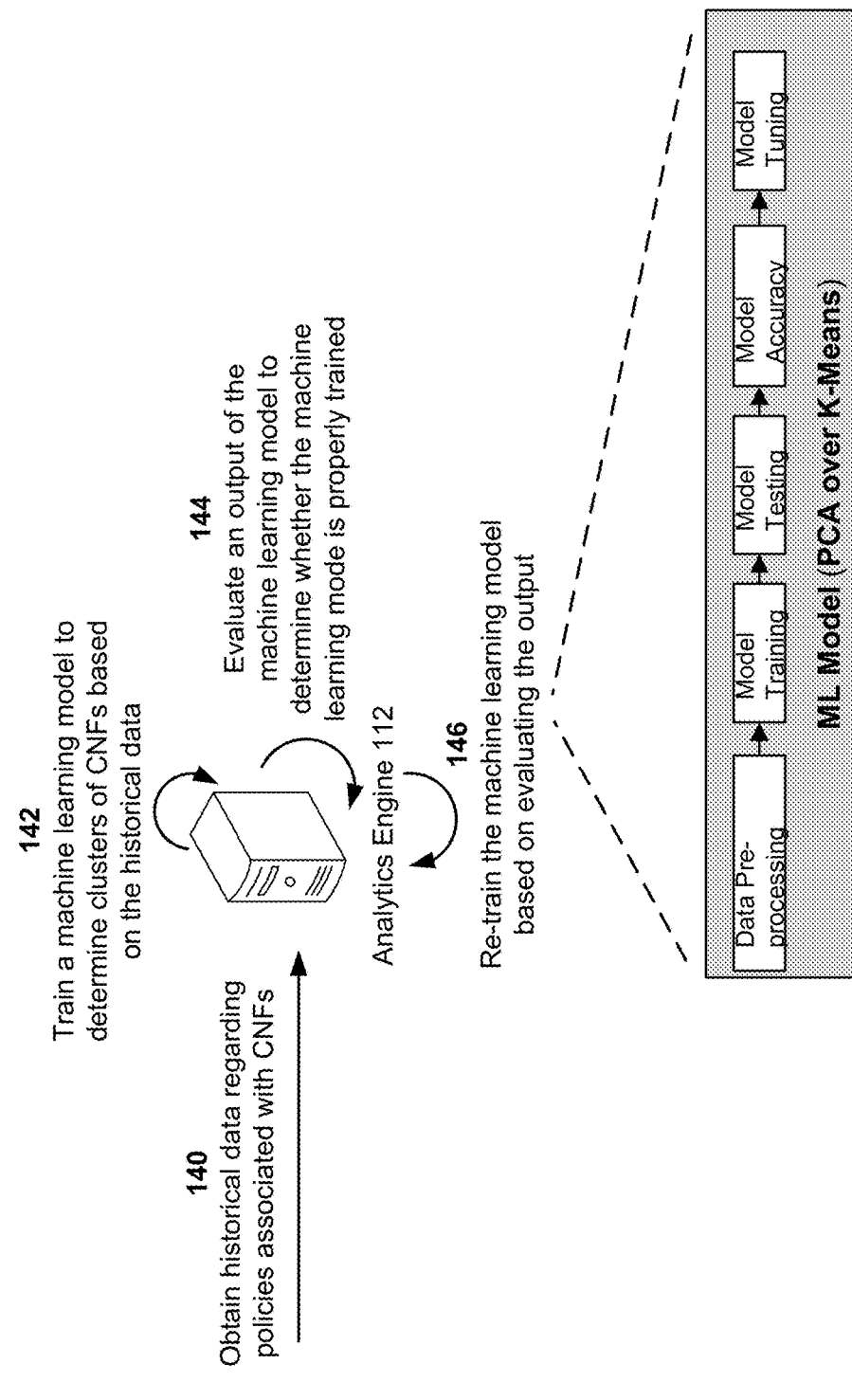

140
Obtain historical data regarding policies associated with CNFs

142
Train a machine learning model to determine clusters of CNFs based on the historical data 144
Evaluate an output of the machine learning model to determine whether the machine learning mode is properly trained Analytics Engine 112

146
Re-train the machine learning model based on evaluating the output

Data Pre-processing → Model Training → Model Testing → Model Accuracy → Model Tuning ML Model (PCA over K-Means)

FIG. 1B

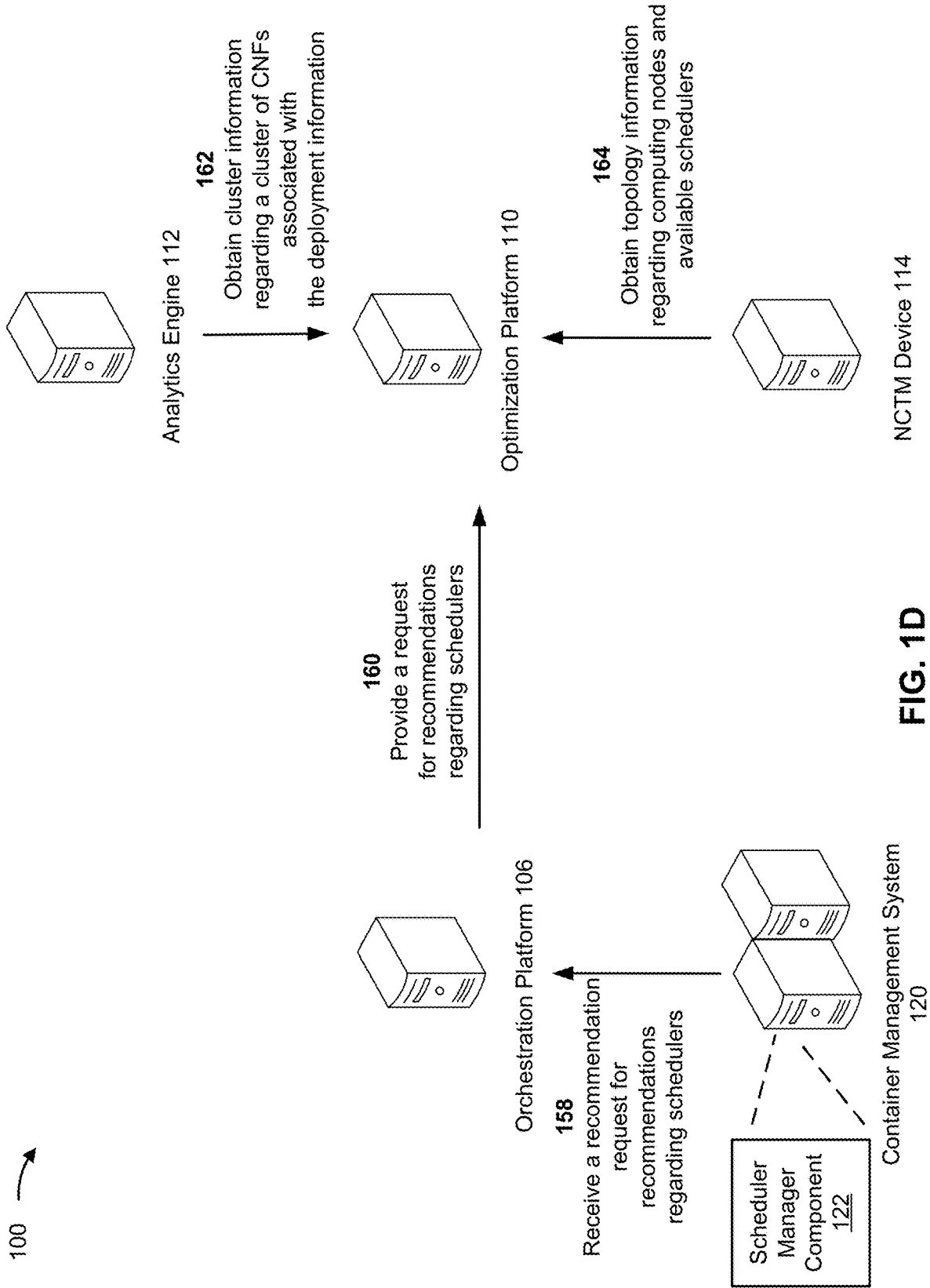

100

Analytics Engine 112

162
Obtain cluster information regarding a cluster of CNFs associated with the deployment information Optimization Platform 110

164
Obtain topology information regarding computing nodes and available schedulers NCTM Device 114

160
Provide a request for recommendations regarding schedulers

Orchestration Platform 106

158
Receive a recommendation request for recommendations regarding schedulers Scheduler Manager Component 122

Container Management System 120

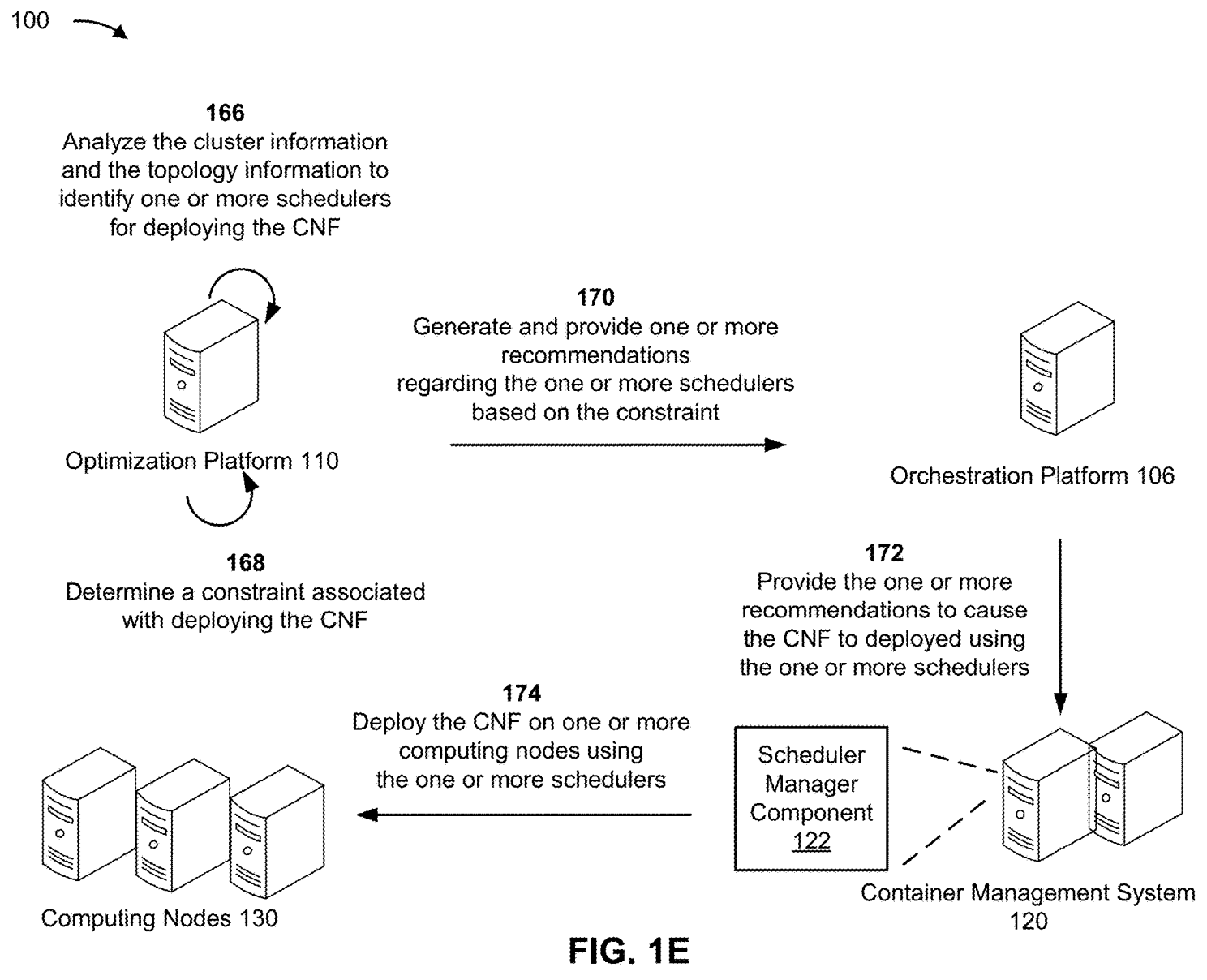

Orchestration Platform 106

166
Analyze the cluster information and the topology information to identify one or more schedulers for deploying the CNF Optimization Platform 110

170
Generate and provide one or more recommendations regarding the one or more schedulers based on the constraint

168
Determine a constraint associated with deploying the CNF

172
Provide the one or more recommendations to cause the CNF to deployed using the one or more schedulers Container Management System 120

Scheduler Manager Component 122

174
Deploy the CNF on one or more computing nodes using the one or more schedulers Computing Nodes 130

FIG. 1E

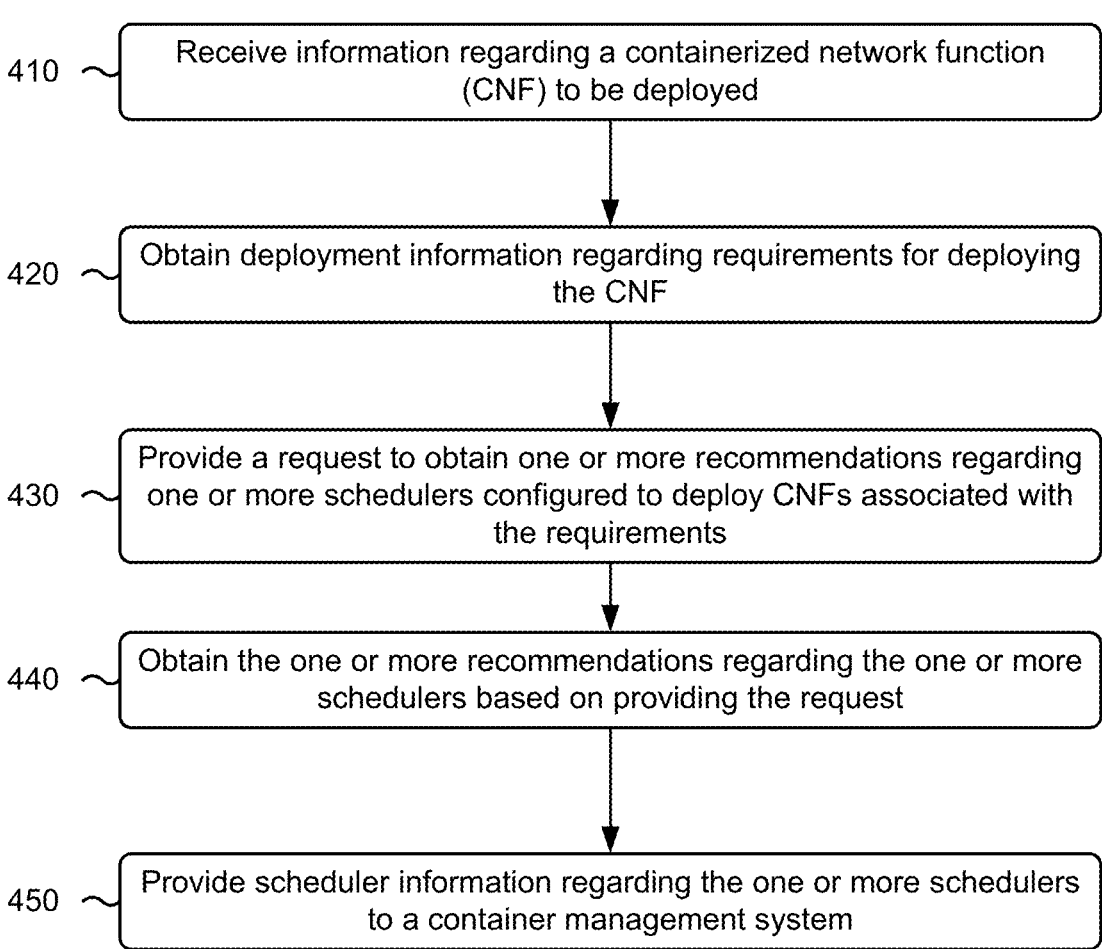

410 — Receive information regarding a containerized network function (CNF) to be deployed 420 — Obtain deployment information regarding requirements for deploying the CNF 430 — Provide a request to obtain one or more recommendations regarding one or more schedulers configured to deploy CNFs associated with the requirements 440 — Obtain the one or more recommendations regarding the one or more schedulers based on providing the request 450 — Provide scheduler information regarding the one or more schedulers to a container management system

FIG. 4

SYSTEMS AND METHODS FOR DEPLOYING A CONTAINERIZED NETWORK FUNCTION (CNF) BASED ON INFORMATION REGARDING THE CNF

BACKGROUND

An application (e.g., a virtual network function application) may be hosted by a cloud platform of a cloud computing environment. For example, the application (e.g., a virtual radio access network (vRAN) application) may be deployed on a containers as a service (CaaS) platform or on a platform as a service (PaaS) platform. The cloud platform may be supported by an infrastructure, such as a network function virtualization (NFV) infrastructure.

BRIEF DESCRIPTION OF THE DRAWINGS

FIGS. 1A-1E are diagrams of an example associated with deploying a containerized network function (CNF) based on information regarding the CNF.

FIG. 4 is a flowchart of an example process relating to deploying a CNF based on information regarding the CNF.

DETAILED DESCRIPTION OF PREFERRED EMBODIMENTS

Figure 1A:
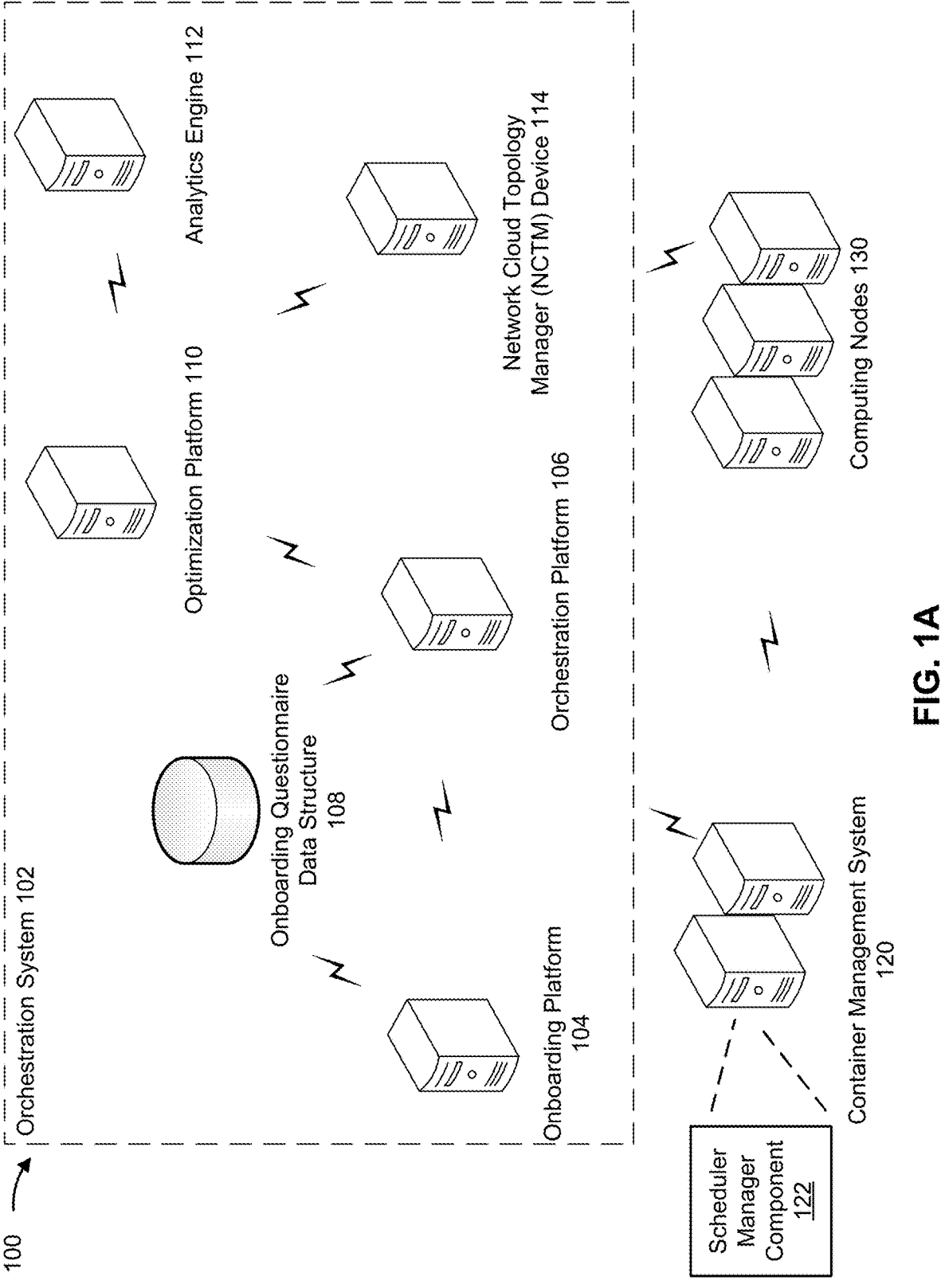

The following detailed description of example implementations refers to the accompanying drawings. The same reference numbers in different drawings may identify the same or similar elements.

A containerized network function (CNF) may be deployed on a computing node (or worker node) of a cloud platform. The CNF may be deployed using a scheduler. Typically, the scheduler deploys the CNF based on a default scheduling scheme. For example, the scheduler deploys the CNF on a first available computing node of a cluster of computing nodes. In this regard, the scheduler lacks topology awareness of a network cloud infrastructure associated with the cloud platform and lacks context-awareness of the CNF. The context-awareness may refer to whether the CNF is a computing-intensive CNF, a memory-intensive CNF, and/or a network-intensive CNF.

For example, the scheduler does not consider capabilities of the computing node with respect to deployment requirements associated with deploying the CNF. The capabilities of the computing node may include computing capabilities, memory capabilities, and/or network connectivity capabilities. For instance, the scheduler does not consider the capabilities of the computing node with respect to computing requirements, memory requirements, and/or network connectivity requirements of the CNF.

Based on the foregoing, the CNF is deployed without taking into consideration unique requirements of the CNF with respect to high performance, minimal latency, high data throughput, and/or energy efficiency. Deploying the CNF in this manner may cause the CNF and/or the computing node to malfunction. Accordingly, deploying the CNF in this manner wastes computing resources, memory resources, and/or storage resources associated with deploying the CNF on another computing node, configuring the computing node to properly support the CNF, among other examples. Additionally, deploying the CNF in this manner causes on an imbalance on the cluster of computing nodes due to recurring creation and/or deletion of CNFs as well as re-configuring of computing nodes in the cloud platform.

Implementations described herein are directed to deploying a CNF on a computing node based on requirements associated with deploying the CNF and capabilities of the computing node. The requirements may include a computing requirement, a memory requirement, and/or a network connectivity requirement. In some examples, an orchestration system may identify one or more custom schedulers configured to deploy the CNF in accordance with the requirements for deploying the CNF. A custom scheduler may refer to a scheduler that is configured to deploy CNFs based on requirements of the CNFs and based on capabilities of computing nodes. In contrast, a default scheduler (as currently used) may refer to a scheduler that is configured to deploy CNFs on a first available computing node.

As an example, the custom scheduler may be a first scheduler (or computing scheduler) configured to deploy CNFs that are computing-intensive on a computing node with a computing capability that supports such CNFs. Alternatively, the custom scheduler may be a second scheduler (or memory scheduler) configured to deploy CNFs that are memory-intensive on a computing node with a memory capability that supports such CNFs. Alternatively, the custom scheduler may be a third scheduler (or network scheduler) configured to deploy CNFs that are network-intensive on a computing node with a network connectivity capability that supports such CNFs.

In some situations, the orchestration system may identify the one or more schedulers based on a recommendation request from a container management system (e.g., a container infrastructure service manager). For example, the orchestration system may receive information regarding the CNF and provide a deployment request to the container management system. The container management system may include a scheduler manager component configured to make an intelligent decision with respect to deploying the CNF (as opposed to causing the CNF to be deployed on a first available computing node). In this regard, the scheduler manager component may provide the recommendation request to the orchestration system.

Based on receiving the recommendation request, the orchestration system may obtain cluster information regarding CNFs with deployment requirements that are similar to the requirements for deploying the CNF. In some situations, the cluster information regarding the CNFs may be obtained using a machine learning model. In some examples, the cluster information regarding the CNFs may indicate schedulers that were used to deploy the CNFs and/or indicate capabilities of computing nodes that support the CNFs.

Based on receiving the recommendation request, the orchestration system may obtain topology information regarding computing nodes that may be used to deploy the CNF and regarding available custom schedulers that may be used to deploy the CNF on the computing nodes. For example, the orchestration system may determine computing capabilities, memory capabilities, and/or network connectivity capabilities of the computing nodes. The orchestration system may analyze the cluster information and the topology information to identify one or more schedulers that are configured to deploy the CNF on one or more computing nodes with capabilities to support the requirements of the CNF.

The orchestration system may generate a recommendation regarding the one or more schedulers and provide the recommendation to the scheduler manager component. In some situations, the orchestration system may determine constraints associated with deploying the CNF. In this regard, the recommendation may indicate that a custom scheduler is to be used to deploy the CNF based on the constraint being a first constraint (e.g., a stringent or hard constraint).

Alternatively, the recommendation may indicate that the customer scheduler or a default scheduler is to be used to deploy the CNF based on the constraint being a second constraint (e.g., a flexible or soft constraint). Alternatively, the recommendation may indicate that the default scheduler is to be used to deploy the CNF if the orchestration system determines that no constraint is associated with deploying the CNF.

The scheduler manager component may use the recommendation to deploy the CNF. For example, the scheduler manager component may use the one or more schedulers to deploy the CNF on the one or more computing nodes with capabilities to support the requirements for deploying the CNF. In this regard, a runtime transformation of a deployment template may occur such that the deployment template includes information identifying the one or more schedulers. The one or more schedulers may cause the CNF to be deployed in one or more execution units (or pods) of the one or more computing nodes.

By deploying the CNF in this manner, implementations described herein may preserve computing resources, memory resources, and/or storage resources that would have been used to deploy the CNF on another computing node, configure the computing node to properly support the CNF, among other examples. Additionally, deploying the CNF in this manner prevents an imbalance on the cluster of computing nodes.

FIGS. 1A-1E are diagrams of an example 100 associated with deploying a CNF based on information regarding the CNF. As shown in FIGS. 1A-1E, example 100 includes an orchestration system 102, a container management system 120, and computing nodes 130. In some implementations, orchestration system 102, container management system 120, and computing nodes 130 may be owned by a service provider. In this regard, for example, container management system 120 may be associated with a private cloud infrastructure.

Orchestration system 102 may include devices capable of receiving, generating, storing, processing, and/or providing information associated with deploying a CNF based on information regarding the CNF, as described elsewhere herein. As shown in FIG. 1A, orchestration system 102 may include an onboard platform 104, an orchestration platform 106, an onboarding questionnaire data structure 108, an optimization platform 110, an analytics engine 112, and a network cloud topology manager (NCTM) device 114. Onboard platform 104 may include one or more devices configured to onboard CNFs, as described herein. For example, onboard platform 104 may be configured to receive information regarding CNFs (e.g., from devices of third parties).

Orchestration platform 106 may include one or more devices configured to orchestrate deployment of CNFs, as described herein. In some examples, orchestration platform 106 may provide a request to container management system 120 to initiate deployment of CNFs. In this regard, orchestration platform 106 may be configured to perform runtime operations associated with deploying CNFs while onboard platform 104 may be configured to perform design time operations associated with CNFs.

Onboarding questionnaire data structure 108 may include a data structure (e.g., a database, a table, and/or a linked list) that stores deployment information, for CNFs, that is used to deploy the CNFs. For example, the deployment information of a particular CNF may include information that may be used to identify one or more appropriate schedulers that are to be used to deploy the particular CNF on one or more appropriate computing nodes, as explained herein.

Optimization platform 110 may include one or more devices configured to provide recommendations for schedulers that are used to optimize deployments of CNFs. In some implementations, optimization platform 110 may determine constraints associated with deploying the CNFs and determine the recommendations based on the constraints. Analytics engine 112 may include one or more devices configured to provide cluster information identifying different clusters of CNFs that have been deployed and/or identifying different schedulers used to deploy the different clusters of CNFs. For example, the cluster information may identify requirements for deploying the different clusters of CNFs.

In some instances, analytics engine 112 may include a machine learning model that is trained to provide the cluster information as an output. NCTM device 114 may include one or more devices configured to identify different schedulers associated with different requirements (e.g., a computing requirement, a storage requirement, and/or a network connectivity requirement). Additionally, or alternatively, NCTM device 114 may identify computing nodes of a cluster of computer nodes associated with container management system 120. For example, NCTM device 114 may identify capabilities of the computing nodes (e.g., computing capabilities, memory capabilities, network connectivity capabilities).

Container management system 120 may include one or more devices configured to deploy, scale, and manage containerized applications. As shown in FIG. 1A, container management system 120 may include a scheduler manager component 122. Scheduler manager component 122 may be configured to provide recommendation requests to optimization platform 110 to obtain recommendations regarding schedulers to be used to deploy a CNF. Scheduler manager component 122 may be part of a control plane of container management system 120. In some examples, container management system 120 may further include an application program interface (API) server, a controller-manager, and one or more schedulers.

The API server may be configured to receive an instantiation request to deploy CNFs and cause the CNFs to be deployed based on the instantiation request. For example, the API server may provide the instantiation request to the controller-manager. The instantiation request may include deployment policies for deploying CNFs. The controller-manager may determine computing resources, storage resources, and/or network connectivity resources associated with deploying the CNFs. The controller-manager and the one or more schedulers may be part of the control plane of container management system 120.

Computing nodes 130 may include devices configured to run containerized applications. Computing nodes 130 may include one or more physical machines and/or one or more virtual machines. In some situations, computing nodes 130 may be part of one or more clusters of computing nodes of a cloud infrastructure associated with container management system 120.

As shown in FIG. 1B, and by reference number 140, analytics engine 112 may obtain historical data regarding policies associated with CNFs. For example, the historical data may be data regarding policies associated with CNFs that have been deployed. The policies may include deployment policies associated with deploying the CNFs, service level agreement (SLA) policies associated with deploying the CNFs, among other examples.

In some examples, the policies may identify different types of services of the CNFs, an amount of central processing unit (CPU) resources required for deploying the CNFs, an amount of storage required for deploying the CNFs, a level of network connectivity required for deploying the CNFs, among other examples. In some examples, the policies may be configured using one or more interfaces (e.g., a policy administration point). The one or more interfaces may be provided by analytics engine 112.

As shown in FIG. 1B, and by reference number 142, analytics engine 112 may train a machine learning model to determine clusters of CNFs based on the historical data. For example, the historical data may be used as training data to train the machine learning model to determine the clusters of CNFs. In some instances, the historical data may be preprocessed prior to being used as training data. For example, the historical data may be normalized prior to being used as training data. In some situations, a cluster of CNFs may have a similar orchestration requirement, a similar communication requirement, and a similar platform requirement.

As a result of the training, the machine learning model may be configured to identify (or predict) a first cluster of CNFs associated with one or more first requirements for deployment, identify (or predict) a second cluster of CNFs associated with one or more second requirements for deployment, identify (or predict) a third cluster of CNFs associated with one or more third requirements for deployment, and so on.

As an example, the first requirement may indicate that the first cluster of CNFs are computing-intensive applications. Additionally, the second requirement may indicate that the second cluster of CNFs are memory-intensive applications. Additionally, the third requirement may indicate that the third cluster of CNFs are network connectivity-intensive applications. A computing-intensive application may require computing resources, for deployment, exceeding a computing resource threshold. A memory-intensive application may require memory resources, for deployment, exceeding a memory resource threshold. A network connectivity-intensive application may require network connectivity resources exceeding a network resource threshold.

In some implementations, the machine learning model may include a principal component analysis (PCA) over K-means machine learning model. For example, the PCA over K-means machine learning model may identify the correlation between the CNFs having similar orchestration requirements, communication requirements, and platform requirements.

As shown in FIG. 1B, and by reference number 144, analytics engine 112 may evaluate an output of the machine learning model to determine whether the machine learning mode is properly trained. For example, analytics engine 112 may analyze the clusters of CNFs with respect to requirements of the cluster of CNFs. For instance, analytics engine 112 may determine a measure of similarity between requirements of the CNFs included in the first cluster of CNFs. In some situations, prior to determining the measure of similarity, analytics engine 112 may determine whether a current iteration of determining the first cluster of CNFs is an improvement of a prior iteration of determining the first cluster of CNFs. Based on determining that the current iteration is an improvement of the prior iteration, analytics engine 112 may determine the measure of similarity.

If analytics engine 112 determines that the measure of similarity satisfies a similarity threshold, analytics engine 112 may store information regarding the first cluster of CNFs in a memory (e.g., a data structure) of analytics engine 112. Analytics engine 112 may perform similar actions with respect to one or more additional clusters of CNFs identified by the machine learning model. In some instances, an output of the trained machine learning model may be used to identify one or more schedulers for deploying CNFs.

As shown in FIG. 1B, and by reference number 146, analytics engine 112 may re-train the machine learning model based on evaluating the output. For example, if analytics engine 112 determines that the measure of similarity does not satisfy the similarity threshold, analytics engine 112 may re-train the machine learning model in a manner similar to the manner described above.

Figure 1C:
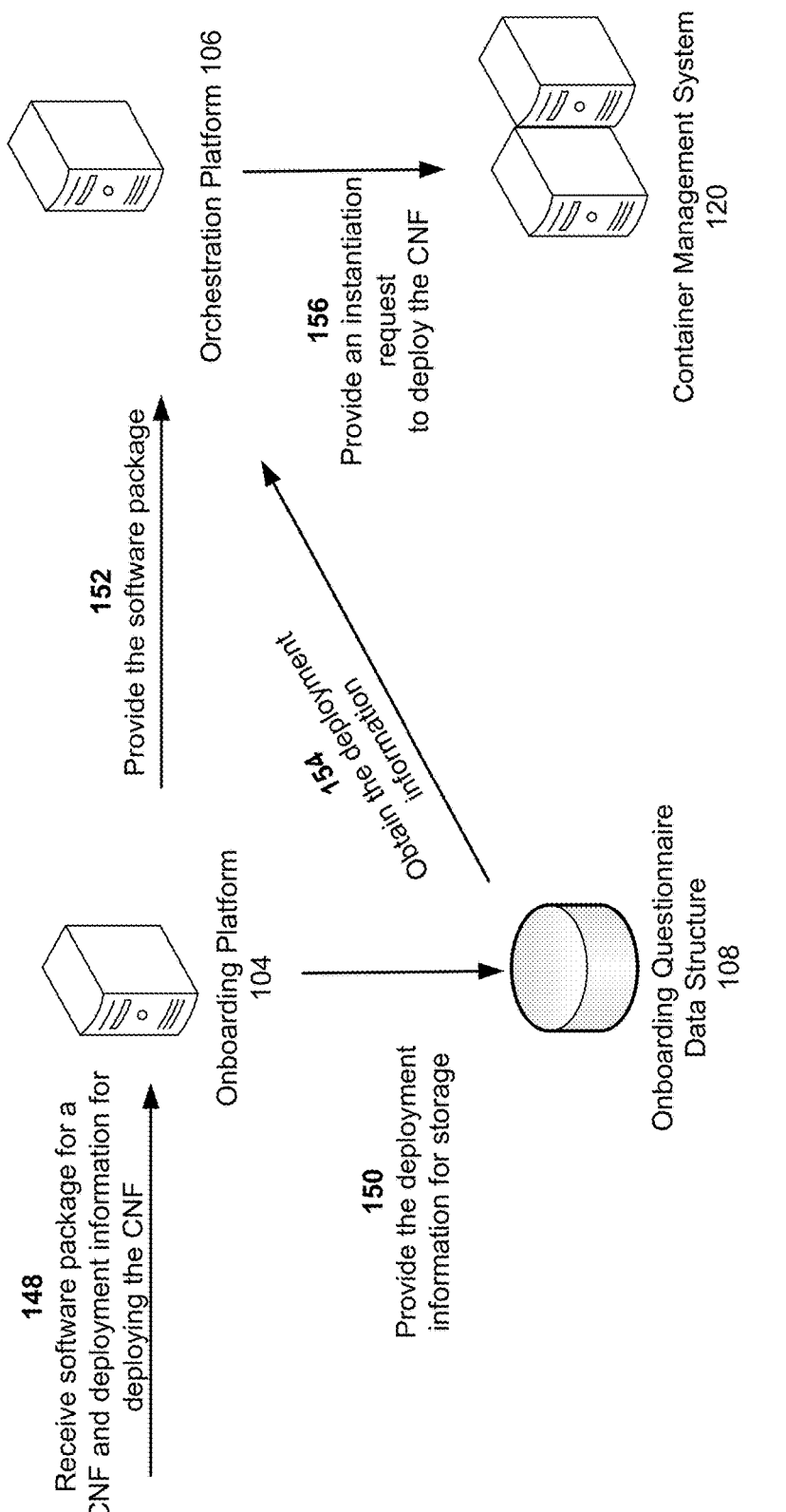

As shown in FIG. 1C, and by reference number 148, onboard platform 104 may receive a software package for a CNF and deployment information for deploying the CNF. In some implementations, after the machine learning model has been trained, onboard platform 104 may receive the software package for a CNF and the deployment information for the CNF. Onboard platform 104 may receive the software package and the deployment information from a third-party software vendor (or a third-party software developer).

In some examples, the software package may include information regarding the CNF (e.g., files that may be used to execute virtual network functions of the CNF). The deployment information may identify one or more requirements for deploying the CNF. For example, the one or more requirements may include one or more of a computing requirement, a memory requirement, a network connectivity requirement, a latency requirement, among other examples.

The deployment information may further include labels associated with the CNF or with applications of the CNF, constraints associated with deploying the CNF, policies associated with deploying the CD, SLAs associated with the CNF, among other examples. Additionally, or alternatively, the deployment information may identify one or more of Internet protocol (IP) addresses associated with the CNF, a cloud platform associated with the CNF, layer 2 information associated with the CNF, layer 3 information associated with the CNF, a virtual local area network associated with the CNF, one or more network trunks associated with the CNF, one or more types of services associated with the CNF, among other examples. In some implementations, the deployment information may be referred to as a customer information questionnaire (CIQ).

As shown in FIG. 1C, and by reference number 150, onboard platform 104 may provide the deployment information for storage. For example, after receiving the deployment information, onboard platform 104 may provide the deployment information to onboarding questionnaire data structure 108 for storage. In some implementations, the deployment information may be stored in association with information identifying the software package and/or information identifying the CNF.

As shown in FIG. 1C, and by reference number 152, onboard platform 104 may provide the software package. For example, after receiving the software package, onboard platform 104 may provide the software package to orchestration platform 106. The software package may be provided to cause orchestration platform 106 to initiate an orchestration process for deploying the CNF.

As shown in FIG. 1C, and by reference number 154, orchestration platform 106 may obtain the deployment information. For example, based on receiving the software package, orchestration platform 106 may obtain the deployment information from onboarding questionnaire data structure 108. In some implementations, orchestration platform 106 may obtain the deployment information using the information identifying the software package and/or the information identifying the CNF. For example, orchestration platform 106 may perform a lookup of onboarding questionnaire data structure 108 using the information identifying the software package and/or the information identifying the CNF As shown in FIG. 1C, and by reference number 156, orchestration platform 106 may provide an instantiation request to deploy the CNF. For example, orchestration platform 106 may provide the instantiation request to container management system 120. For instance, orchestration platform 106 may provide the instantiation request to the API server of container management system 120. In some implementations, the instantiation request may include the deployment information of the CNF. For example, the instantiation request may include metadata regarding the requirements and/or the policies for deploying the CNF.

As explained above, the API server may provide the instantiation request to the controller-manager. The instantiation request may include deployment policies for deploying the CNF. Based on receiving the instantiation request, the controller-manager may determine computing resources, storage resources, and/or network connectivity resources associated with deploying the CNF. The controller-manager may provide the instantiation request to scheduler manager component 122. In some situations, the API server may provide the instantiation request to a server-daemon, and the server-daemon may provide the instantiation request to scheduler manager component 122.

As shown in FIG. 1D, and by reference number 158, orchestration platform 106 may receive a recommendation request for recommendations regarding schedulers. For example, after receiving the instantiation request, scheduler manager component 122 may provide the recommendation request to orchestration platform 106. The recommendation request may be a request to identify one or more schedulers that are appropriate for deploying the CNF on one or more computing nodes with capabilities that support the requirements for deploying the CNF.

Scheduler manager component 122 may analyze the deployment policies associated with deploying the CNF and determine constraints associated with deploying the CNF. The deployment policies may identified by the instantiation request. Scheduler manager component 122 may determine that a custom scheduler is to be used to deploy the CNF based on the constraint being a first constraint (e.g., a stringent or hard constraint). Alternatively, scheduler manager component 122 may determine that a default scheduler is to be used to deploy the CNF based on the constraint being a second constraint (e.g., a flexible or soft constraint). Accordingly, based on determining that the custom scheduler is to be used, scheduler manager component 122 may provide the recommendation request to orchestration platform 106.

As shown in FIG. 1D, and by reference number 160, orchestration platform 106 may provide a request for recommendations regarding schedulers. For example, based on receiving the recommendation request, orchestration platform 106 may provide the recommendation request to optimization platform 110. In some implementations, orchestration platform 106 may provide a request to optimization platform 110 independently of receiving the recommendation request from container management system 120. For example, orchestration platform 106 may provide the request after receiving the software package from onboard platform 104.

As shown in FIG. 1D, and by reference number 162, optimization platform 110 may obtain cluster information regarding a cluster of CNFs associated with the deployment information. For example, based on receiving the request from orchestration platform 106, optimization platform 110 may obtain the cluster information to identify a cluster of CNFs with requirements that are similar to the requirements for deploying the CNF. In some situations, optimization platform 110 may provide (to analytics engine 112) a cluster request that includes information regarding the requirements for deploying the CNF. Based on receiving the cluster request, analytics engine 112 may provide the cluster information.

In some situations, analytics engine 112 may perform a lookup of a data structure that stores information identifying different clusters of CNFs in association with information identifying requirements for deploying the different clusters of CNFs. The requirements for deploying the different clusters of CNFs may include one or more computing requirements, one or more memory requirements, one or more network connectivity requirements, one or more latency requirements, and/or one or more requirements relating to SLAs associated with the different clusters of CNFs.

In some examples, the data structure may store information identifying a first cluster of CNFs in association with information identifying one or more first requirements for deploying the first cluster of CNFs, store information identifying a second cluster of CNFs in association with information identifying one or more second requirements for deploying the second cluster of CNFs, and so on. Optimization platform 110 may obtain the cluster information based on performing the lookup using the information regarding the requirements for deploying the CNF.

Additionally, or alternatively, analytics engine 112 may obtain the cluster information using the machine learning model. For example, analytics engine 112 may provide the information regarding the requirements as an input to the machine learning model, and analytics engine 112 may obtain the cluster information as an output of the machine learning model. Analytics engine 112 may provide the cluster information to optimization platform 110. In some examples, the cluster information may identify one or more schedulers that were used to deploy the cluster of CNFs.

As shown in FIG. 1D, and by reference number 164, optimization platform 110 may obtain topology information regarding computing nodes and available schedulers. For example, based on receiving the request from orchestration platform 106, optimization platform 110 may obtain the topology information regarding computing nodes 130 associated with container management system 120 and regarding available custom schedulers for deploying CNFs on the computing node. In some implementations, optimization platform 110 may provide a request for the topology information to NCTM device 114. Based on receiving the request, NCTM device 114 may provide the topology information to optimization platform 110. For example, NCTM device 114 may obtain the topology information from a memory (e.g., a data structure of NCTM device 114.

The topology information may indicate capabilities of the computing nodes 130. For example, the topology information may indicate computing capabilities, memory capabilities, and/or network connectivity capabilities of the computing nodes 130. In some implementations, the topology information may include a prioritized list for the computing nodes 130 (e.g., based on weighted priorities). For example, NCTM device 114 may order the computing nodes 130 based on the capabilities of the computing nodes 130 for supporting the deployment of the CNF.

Additionally, the topology information may indicate whether custom schedulers are available for deploying the CNF. In some situations, the request (provided to NCTM device 114) may indicate whether the CNF is a computing-intensive CNF, a memory-intensive CNF, and/or a network-intensive CNF. In this regard, based on the request, NCTM device 114 may determine availabilities of one or more computing schedulers configured to deploy computing-intensive CNFs, availabilities of one or more memory schedulers configured to deploy memory-intensive CNFs, and/or availabilities of one or more network schedulers configured to deploy network-intensive CNFs. Accordingly, the topology information may indicate the availabilities of the one or more computing schedulers, of the one or more memory schedulers, and/or of the one or more network schedulers.

The one or more computing schedulers may be configured to deploy computing-intensive CNFs on computing nodes 130 with appropriate computing capabilities. The one or more memory schedulers may be configured to deploy memory-intensive CNFs on computing nodes 130 with appropriate memory capabilities. The one or more network schedulers may be configured to deploy network-intensive CNFs on computing nodes 130 with appropriate network connectivity capabilities.

As shown in FIG. 1E, and by reference number 166, optimization platform 110 may analyze the cluster information and the topology information to identify one or more schedulers for deploying the CNF. For example, based on the cluster information, optimization platform 110 may determine the cluster of CNFs with requirements similar to the requirements for deploying the CNF. Additionally, based on the cluster information, optimization platform 110 may determine schedulers that were used to deploy the cluster of CNFs.

In some implementations, optimization platform 110 may compare information regarding the schedulers identified in the cluster information and information regarding the available clusters to determine whether the schedulers are available. Additionally, based on the topology information, optimization platform 110 may determine availabilities of the computing nodes 130 that were used by the schedulers to deploy the cluster of CNFs.

As shown in FIG. 1E, and by reference number 168, optimization platform 110 may determine a constraint associated with deploying the CNF. For example, based on receiving the request from orchestration platform 106, optimization platform 110 may analyze the deployment information to identify a constraint associated with deploying the CNF. For example, optimization platform 110 may determine whether the constraint is a first constraint that requires a custom scheduler to be used to deploy the CNF or whether the constrain is a second constraint that enables a customer scheduler or a default scheduler to be used to deploy the CNF. Alternatively, optimization platform 110 may determine that the deployment information does not identify a constraint.

As shown in FIG. 1E, and by reference number 170, optimization platform 110 may generate and provide one or more recommendations regarding the one or more schedulers based on the constraint. For example, optimization platform 110 may provide the one or more recommendations to orchestration platform 106. In some implementations, if optimization platform 110 determines that the constraint is the first constraint, optimization platform 110 may determine that a custom scheduler is to be used to deploy the CNF. In this regard, optimization platform 110 may determine the one or more availabilities of the one or more custom schedulers and generate a recommendation indicating that the one or more customer schedulers are to be used if the one or more custom schedulers are available. In this regard, the one or more customer schedulers are to be used to select one or more appropriate computing nodes 130 for deploying the CNF. In some implementations, the recommendation may identify the one or more appropriate computing nodes 130.

If optimization platform 110 determines that the constraint is the second constraint, optimization platform 110 may determine that a custom scheduler or a default scheduler is to be used to deploy the CNF. In this regard, optimization platform 110 may determine the one or more availabilities of the one or more custom schedulers and generate a recommendation indicating that the one or more customer schedulers are to be used if the one or more custom schedulers are available. The recommendation may further indicate that the default scheduler is to be used to deploy the CNF (e.g., select a next available computing node) if the one or more customer schedulers are unable to select an appropriate computing node 130. Alternatively, if NCTM device 114 determines that the deployment information does not identify a constraint, optimization platform 110 may generate a recommendation to use a default scheduler to deploy the CNF.

As shown in FIG. 1E, and by reference number 172, orchestration platform 106 may provide the one or more recommendations to cause the CNF to deployed using the one or more schedulers. For example, orchestration platform 106 may provide the one or more recommendations to scheduler manager component 122 of container management system 120.

As shown in FIG. 1E, and by reference number 174, scheduler manager component 122 may deploy the CNF on one or more computing nodes 130 using the one or more schedulers. In some implementations, scheduler manager component 122 may modify a deployment template, for deploying the CNF, to include information identifying the one or more schedulers. By modifying the deployment template in this manner, scheduler manager component 122 may cause the one or more schedulers to be used to select one or more computing nodes 130 with capabilities that support deployment of the CNF.

By deploying the CNF in this manner, implementations described herein may preserve computing resources, memory resources, and/or storage resources that would have been used to deploy the CNF on another computing node, configure the computing node to properly support the CNF, among other examples. Additionally, deploying the CNF in this manner prevents an imbalance on the cluster of computing nodes 130.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
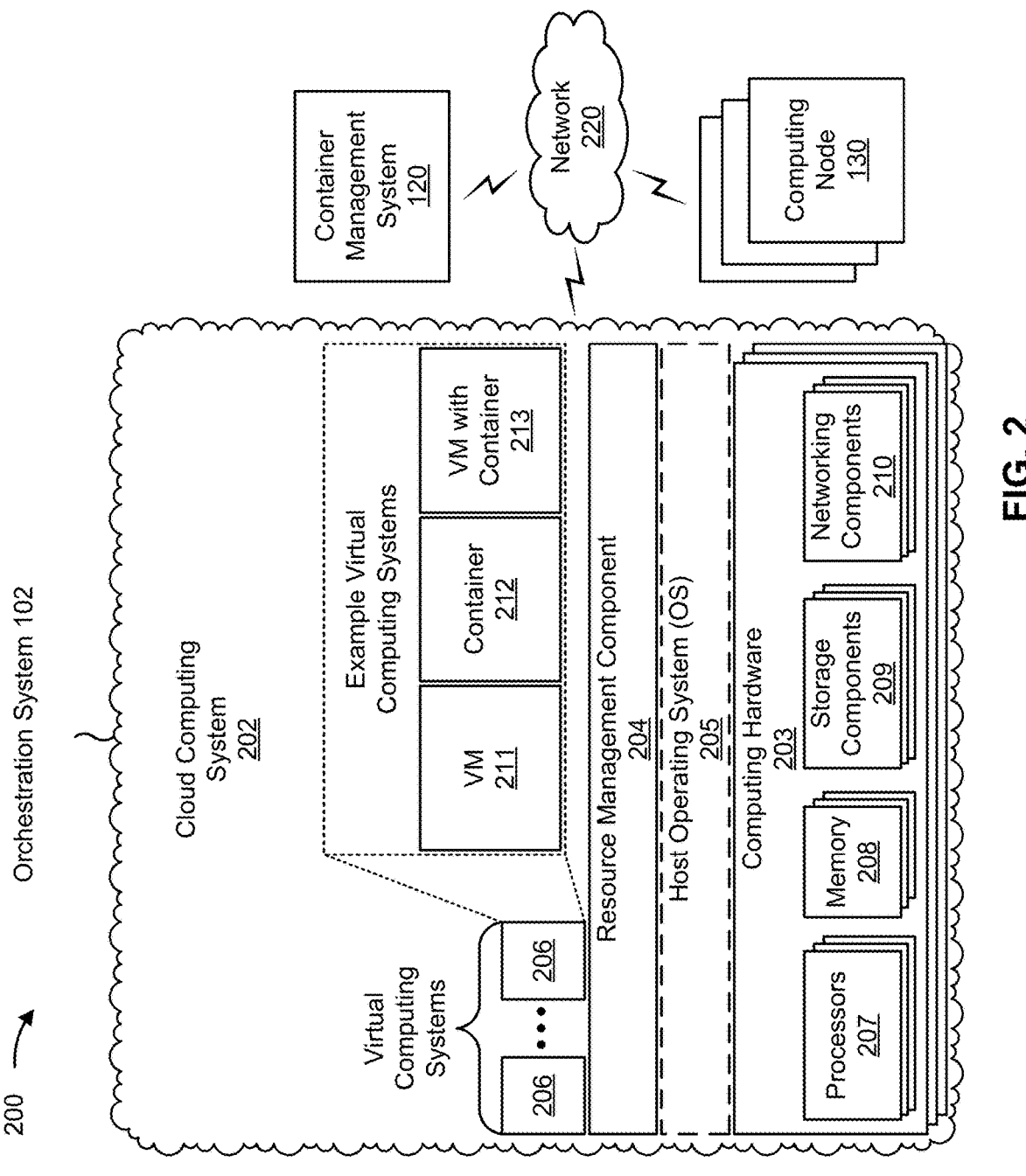
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an orchestration system 102, which may include one or more elements of and/or may execute within a cloud computing system 202. The cloud computing system 202 may include one or more elements 203-213, as described in more detail below. As further shown in FIG. 2, environment 200 may include a network 220, container management system 120, and/or computing nodes 130. Devices and/or elements of environment 200 may interconnect via wired connections and/or wireless connections. Container management system 120 and computing nodes 130 have been described above in connection with FIG. 1.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the orchestration system 102 may include one or more elements 203-213 of the cloud computing system 202, may execute within the cloud computing system 202, and/or may be hosted within the cloud computing system 202, in some implementations, the orchestration system 102 may not be cloud-based (e.g., may be implemented outside of a cloud computing system) or may be partially cloud-based. For example, the orchestration system 102 may include one or more devices that are not part of the cloud computing system 202, such as device 300 of FIG. 3, which may include a standalone server or another type of computing device. The orchestration system 102 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
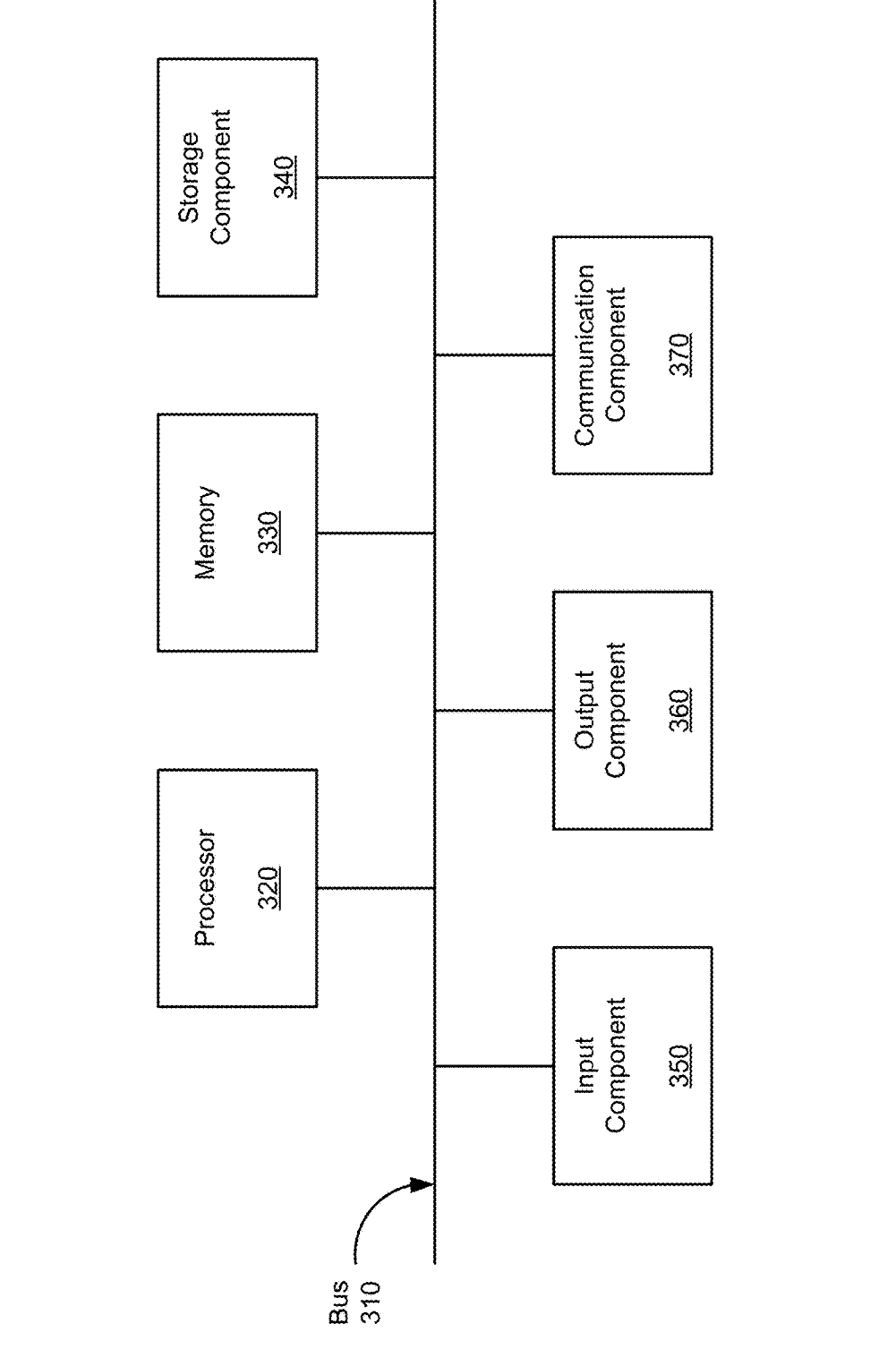
FIG. 3 is a diagram of example components of one or more devices of FIG. 2.

FIG. 3 is a diagram of example components of a device 300, which may correspond to orchestration system 102, container management system 120, and/or computing nodes 130. In some implementations, orchestration system 102, container management system 120, and/or computing nodes 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to deploying a CNF based on information regarding the CNF. In some implementations, one or more process blocks of FIG. 4 may be performed by an orchestration system (e.g., orchestration system 102). In some implementations, one or more process blocks of FIG. 4 may be performed by another device or a group of devices separate from or including the orchestration system, such as container management system 120 (e.g., container management system 120) and/or computing nodes (e.g., computing nodes 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving information regarding a containerized network function (CNF) to be deployed (block 410). For example, the orchestration system may receive information regarding a containerized network function (CNF) to be deployed, as described above.

As further shown in FIG. 4, process 400 may include obtaining deployment information regarding requirements for deploying the CNF (block 420). For example, the orchestration system may obtain deployment information regarding requirements for deploying the CNF, wherein the requirements include one or more of a computing requirement, a memory requirement, or a network connectivity requirement, as described above. In some implementations, the requirements include one or more of a computing requirement, a memory requirement, or a network connectivity requirement.

As further shown in FIG. 4, process 400 may include providing a request to obtain one or more recommendations regarding one or more schedulers configured to deploy CNFs associated with the requirements (block 430). For example, the orchestration system may provide a request to obtain one or more recommendations regarding one or more schedulers configured to deploy CNFs associated with the requirements, as described above.

As further shown in FIG. 4, process 400 may include obtaining the one or more recommendations regarding the one or more schedulers based on providing the request (block 440). For example, the orchestration system may obtain the one or more recommendations regarding the one or more schedulers based on providing the request, as described above.

As further shown in FIG. 4, process 400 may include providing scheduler information regarding the one or more schedulers to a container management system (block 450). For example, the orchestration system may provide scheduler information regarding the one or more schedulers to a container management system, wherein the scheduler information is provided to cause the container management system to use the one or more schedulers to deploy the CNF on one or more computing nodes that comply with the requirements, as described above. In some implementations, the scheduler information is provided to cause the container management system to use the one or more schedulers to deploy the CNF on one or more computing nodes that comply with the requirements.

In some implementations, process 400 includes obtaining cluster information identifying a cluster of CNFs associated with the requirements for deploying the CNF, and determining the one or more recommendations based on the cluster information.

In some implementations, obtaining the cluster information comprises providing the deployment information as an input to a machine learning model trained to identify clusters of CNFs, and obtaining the cluster information as an output of the machine learning model.

In some implementations, process 400 includes obtaining topology information identifying schedulers configured to deploy CNFs associated with the requirements for deploying the CNF, and determining the one or more recommendations based on the topology information.

In some implementations, the request to obtain the one or more recommendations is a first request, and wherein providing the first request to obtain the one or more recommendations comprises receiving a second request for the one or more recommendations from a scheduler manager component of the container management system, and providing the first request to obtain the one or more recommendations based on receiving the second request.

In some implementations, process 400 includes determining a constraint associated with deploying the CNF, and determining the one or more recommendations based on the constraint.

In some implementations, the one or more recommendations indicate that a custom scheduler is to be used to deploy the CNF based on the constraint being a first constraint, and wherein the one or more recommendations indicate that the custom scheduler or a default scheduler is to be used to deploy the CNF based on the constraint being a second constraint.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by an orchestration system, the method comprising:
   receiving information regarding a containerized network function (CNF) to be deployed;
   obtaining deployment information regarding requirements for deploying the CNF,
      wherein the requirements include one or more of a computing requirement, a memory requirement, or a network connectivity requirement;
   providing a request to obtain one or more recommendations regarding one or more schedulers configured to deploy CNFs associated with the requirements;
   obtaining the one or more recommendations regarding the one or more schedulers based on providing the request; and
   providing the one or more recommendations regarding the one or more schedulers to a container management system,
      wherein the one or more recommendations are provided to cause the container management system to use the one or more schedulers to deploy the CNF on one or more computing nodes that comply with the requirements,
      wherein the one or more recommendations indicate that the one or more schedulers include a default scheduler or a custom scheduler, and
      wherein the custom scheduler is configured to deploy the CNF based on capabilities of the one or more computing nodes.

2. The method of claim 1, further comprising:
   obtaining cluster information identifying a cluster of CNFs associated with the requirements for deploying the CNF; and
   determining the one or more recommendations based on the cluster information.

3. The method of claim 2, wherein obtaining the cluster information comprises:
   providing the deployment information as an input to a machine learning model trained to identify clusters of CNFs; and
   obtaining the cluster information as an output of the machine learning model.

4. The method of claim 1, further comprising:
   obtaining topology information identifying schedulers configured to deploy CNFs associated with the requirements for deploying the CNF; and
   determining the one or more recommendations based on the topology information.

5. The method of claim 1, wherein the request to obtain the one or more recommendations is a first request, and wherein providing the first request to obtain the one or more recommendations comprises:

receiving a second request for the one or more recommendations from a scheduler manager component of the container management system; and providing the first request to obtain the one or more recommendations based on receiving the second request.

6. The method of claim 1, further comprising:

determining a constraint associated with deploying the CNF; and determining the one or more recommendations based on the constraint.

7. The method of claim 6, wherein the one or more recommendations indicate that the custom scheduler is to be used to deploy the CNF based on the constraint being a first constraint, and wherein the one or more recommendations indicate that the custom scheduler or the default scheduler is to be used to deploy the CNF based on the constraint being a second constraint.

8. An orchestration system, comprising:

one or more processors configured to:

receive information regarding a containerized network function (CNF) to be deployed;

obtain deployment information regarding requirements for deploying the CNF, wherein the requirements include one or more of a computing requirement, a memory requirement, or a network connectivity requirement;

obtain cluster information identifying a cluster of CNFs with deployment requirements that are similar to the requirements for deploying the CNF, wherein the cluster information indicates schedulers that were used to deploy the cluster of CNFs and indicate capabilities of computing nodes that support the cluster of CNFs;

determine that the schedulers, that were used to deploy the cluster of CNFs, are available;

generate a recommendation regarding one or more schedulers, of the schedulers, based on the cluster information; and provide the recommendation regarding the one or more schedulers to a container management system, wherein the recommendation is provided to cause the container management system to use the one or more schedulers to deploy the CNF on one or more computing nodes that comply with the requirements.

9. The orchestration system of claim 8, wherein the one or more processors, to obtain the cluster information, are configured to:

provide the deployment information as an input to a machine learning model trained to identify clusters of CNFs; and obtain the cluster information as an output of the machine learning model.

10. The orchestration system of claim 8, wherein the one or more processors, to determine that the schedulers are available, are further configured to:

obtain topology information identifying the schedulers; and determine that the schedulers are available based on the topology information.

11. The orchestration system of claim 8, wherein the one or more processors, to generate the recommendation regarding the one or more schedulers, are configured to:

receive a request for the recommendation from a scheduler manager component of the container management system; and generate the recommendation based on receiving the request.

12. The orchestration system of claim 8, wherein the one or more processors are further configured to:

determine a constraint associated with deploying the CNF; and determine the recommendation based on the constraint.

13. The orchestration system of claim 12, wherein the recommendation indicates that a custom scheduler is to be used to deploy the CNF based on the constraint being a first constraint, and wherein the recommendation indicates that a custom scheduler or a default scheduler is to be used to deploy the CNF based on the constraint being a second constraint.

14. The orchestration system of claim 8, wherein the one or more schedulers include one or more of a first scheduler configured to deploy CNFs that require computing resources exceeding a computing resource threshold, a second scheduler configured to deploy CNFs that require memory resources exceeding a memory resource threshold, or a third scheduler configured to deploy CNFs that require network connectivity resources exceeding a network resource threshold.

15. A non-transitory computer-readable medium storing a set of instructions, the set of instructions comprising:

one or more instructions that, when executed by one or more processors of an orchestration system, cause the orchestration system to:

receive information regarding a containerized network function (CNF) to be deployed;

obtain deployment information regarding requirements for deploying the CNF, wherein the requirements include one or more of a computing requirement, a memory requirement, or a network connectivity requirement;

obtain cluster information identifying a cluster of CNFs associated with the requirements for deploying the CNF;

determine that schedulers, configured to deploy CNFs associated with the requirements, are available;

generate a recommendation regarding one or more schedulers, of the schedulers, based on the cluster information; and provide the recommendation regarding the one or more schedulers to a container management system, wherein the recommendation is provided to cause the container management system to use the one or more schedulers to deploy the CNF on one or more computing nodes that comply with the requirements, wherein the recommendation indicates that the one or more schedulers include a default scheduler or a custom scheduler, and wherein the custom scheduler is configured to deploy the CNF based on capabilities of the one or more computing nodes.

16. The non-transitory computer-readable medium of claim 15, wherein the one or more instructions, that cause the orchestration system to obtain the cluster information, cause the orchestration system to:

provide the deployment information as an input to a machine learning model trained to identify clusters of CNFs; and obtain the cluster information as an output of the machine learning model.

17. The non-transitory computer-readable medium of claim 15, wherein the one or more instructions, that cause the orchestration system to determine that the schedulers are available, cause the orchestration system to:

obtain topology information identifying the schedulers; and determine that the schedulers are available based on the topology information.

18. The non-transitory computer-readable medium of claim 15, wherein the one or more instructions, that cause the orchestration system to generate the recommendation regarding the one or more schedulers, cause the orchestration system to:

receive a request for the recommendation from a scheduler manager component of the container management system; and generate the recommendation based on receiving the request.

19. The non-transitory computer-readable medium of claim 15, wherein the one or more instructions further cause the orchestration system to:

determine a constraint associated with deploying the CNF; and determine the recommendation based on the constraint.

20. The non-transitory computer-readable medium of claim 15, wherein the one or more schedulers include one or more of a first scheduler configured to deploy CNFs that require computing resources exceeding a computing resource threshold, a second scheduler configured to deploy CNFs that require memory resources exceeding a memory resource threshold, or a third scheduler configured to deploy CNFs that require network connectivity resources exceeding a network resource threshold.

* * * * *